United States Patent [19]
Pinnavaia et al.

[11] Patent Number: 5,834,391
[45] Date of Patent: Nov. 10, 1998

[54] POROUS CLAY HETEROSTRUCTURES PREPARED BY GALLERY TEMPLATED SYNTHESIS

[75] Inventors: Thomas J. Pinnavaia, East Lansing, Mich.; Anne H. Galarneau, Hérault, France; Anis F. Barodawalla, East Lansing, Mich.

[73] Assignee: Board of Trustees operating Michigan State University, East Lansing, Mich.

[21] Appl. No.: 986,313

[22] Filed: Dec. 5, 1997

Related U.S. Application Data

[62] Division of Ser. No. 618,317, Mar. 19, 1996, Pat. No. 5,726,113.

[51] Int. Cl.$^6$ .................................................. B01J 21/16
[52] U.S. Cl. .............................. 502/62; 502/63; 502/80; 502/84
[58] Field of Search ................................ 502/62, 63, 80, 502/84

[56] References Cited

U.S. PATENT DOCUMENTS

| | | | |
|---|---|---|---|
| 4,859,648 | 8/1989 | Landis et al. | 502/242 |
| 5,750,085 | 5/1998 | Yamada et al. | 423/328.2 |

OTHER PUBLICATIONS

Tanev, P. and Pinnavaia, T.J., Science 267:865 (1994) "A Natural Templating Route to Mesoporous Sieves".
Dailey, J. and T.J. Pinnavaia, in Chem Materials 4:855–863 (1992) "Silica—Pillared Derviatives of Ht—Magadite, a Crystalline Hydrated Silica".
Landis, M.E., et al., J. Am. Chem. SOc. 113:3189–3190 (1991) "Preparation of Mol. Sieves from Dense Layered Metal Oxides".
Sing et al., Pure Appl. Chem., 57:603–619 (1985) "Reporting Physiasorption Data for Gas/Solid Systems".
Horvath, G. and K.J. Kawazoe, J., Chem. Eng. Jpn. 16:470–475 (1983) "Method for the Calculation of Effective Pore Size Distribution in Molecular Sieve Carbon".

*Primary Examiner*—Michael L. Lewis
*Assistant Examiner*—Thomas G. Dunn, Jr.
*Attorney, Agent, or Firm*—Ian C. McLeod

[57] ABSTRACT

A porous clay heterostructure of a 2:1 layered silicate prepared by a gallery templated synthesis method is described. The method uses an inorganic oxide, a neutral amine surf surfactant and a quaternary onium ion surfactant in the galleries of the 2:1 layered silicate. The structure is then calcined to remove the surfactants which act as a template to produce the porous clay heterostructure. The structure is useful for cracking catalysts, molecular sieves and adsorbents.

8 Claims, No Drawings

POROUS CLAY HETEROSTRUCTURES PREPARED BY GALLERY TEMPLATED SYNTHESIS

This application is a divisional of U.S. patent application Ser. No. 08/618,317, filed on Mar. 19, 1996, now U.S. Pat. No. 5,726,113.

GOVERNMENT RIGHTS

The present invention was sponsored under National Science Foundation Contract CHE 9224102. The Government has certain rights to this invention.

BACKGROUND OF INVENTION (1) Field of Invention

This invention relates to a method of synthesis of porous clay heterostructures by a new intragallery templating reaction. The reaction expands the use of layered silicate clays with 2:1 (mica-type) layered lattice structures for the design of nanoporous solids and so provides unique opportunities to improve the properties of these surface active lamellar structures by facilitating diffusion of guest species. Appropriate combinations of ionic and neutral amine-based intragallery surfactants as structure-directing agents and a neutral metal oxide precursor (preferably tetraethylorthosilicate) produces a silica mesostructure within the gallery of the layered host. Removing the surfactants by calcination affords mesoporous derivatives with surface areas of 400–900 $m^2/g$ and pore widths in the range 1.2–4.0 nm, depending on the surfactant system used. The invention produces heterostructures which are useful as heterogeneous catalysts, molecular sieves and adsorbents.

(2) Description of Prior Art

There are two classes of materials used extensively as heterogeneous catalysts and adsorption media: (1) microporous (pore diameters <~2.0 nm) and, (2) mesoporous (~2.0–50 nm) inorganic solids. Microporous solids are exemplified by zeolites and their related compounds. Zeolites are aluminosilicates with periodic three-dimensional framework structures containing voids. Due to the periodicity of the structure of these crystalline solids, they exhibit an extremely narrow pore size distribution. This is important for their size-specific applications in adsorption, molecular sieving and shape-selective catalysis. Due to the outstanding properties of these materials a great deal of research was done in search of new materials, especially with well-defined pore opening, lying in the mesoscopic range (pore diameter: 2.0–0.50 nm). Two size domains are very important for shape-selective catalytic applications for large molecules: the 1.5–2.5 nm and the 6.0–8.0 nm pore size. There were two major paths of synthesis developed over the years.

First, there have been numerous attempts to extend the hydrothermal synthetic procedure used to prepare microporous zeolite-type structures to the mesoporous regime by using a large molecule as a template, such as in VPI-5 and cloverite, both giving a pore opening of ca. 1.3 nm. Success in synthesizing materials with pore diameter >1.5 nm was very limited until recently with the discovery of a new family of mesoporous molecular sieves, designated as M41S. MCM-41, one of the members of this extensive family of mesoporous sieves, possess a hexagonal array of uniform mesopores which could be varied from approximately 1.8 to 10 nm in pore diameter depending on the chain length of the surfactant (quaternary ammonium cation) used. Most of the recent studies discussing this synthesis have agreed upon a templating mechanism in which rod-shaped micelles of surfactants serve as organic templates; in fact there is a cooperative assembly of the inorganic precursor (silicate ion) and the surfactants which organize into rods and then in an hexagonal liquid crystal-like structure. This mechanism is under electrostatic interactions.

Recently Tanev and Pinnavaia (Tanev, P. and Pinnavaia, T. J., Science 267:865 (1994)) have shown a similar but non-ionic mechanism for the synthesis of hexagonal mesoporous structures (HMS) by using, instead of quaternary ammonium surfactants, neutral primary amines and neutral inorganic precursors, such as tetraethylorthosilicate (TEOS); the cooperative assembly being controlled by hydrogen-bonding.

A second important synthetic procedure developed to obtain mesoporosity is by means of the pillaring of layered solids with ionic bulky inorganic aggregates as aluminum or zirconium species. Many layered materials are known which have three dimensional structures and exhibit their strongest chemical bonding in only two dimensions. In such materials, the stronger chemical bonds are formed in two-dimensional planes and a three dimensional solid is formed by stacking such planes on top of each other. The weaker bonds generally arise from interlayer attractions such as van der Waals forces, electrostatic interactions, and hydrogen bonding. The silicate layers of a number of clay materials are held together by electrostatic attraction mediated by ions located between the layers. Laminated materials such as clays may be modified to increase their surface area. Various approaches have been taken to provide layered materials of enhanced interlayered distance which have thermal stability. For example U.S. Pat. No. 4,859,648 and related patents and a paper publicized by James Dailey and T. J. Pinnavaia, in Chem Materials (4:855–863 (1992)) incorporated herein by reference disclose layered chalcogenide materials of high thermal stability and surface area which contain interspathic polymeric chalcogenides such as polymeric silicas are prepared by ion exchanging a layered metal oxide, such as layered titanium oxide, layered magadiite etc, with an organic cation, to spread the layers apart. The TEOS hydrolysis reactions reported thereafter affords pillared products, not gallery-templated derivatives. Layered materials can lead to porous materials when the sheets are propped apart by pillaring intercalative species. Pillared materials are all microporous (pore diameter >1.0 nm) and exhibit some mesoporosity, but the mesoporosity in these compounds is due to a disordered arrangement in the layer stacking giving rise to a very broad pore size distribution in the mesoscopic range between 5.0–20.0 nm. The TEOS hydrolysis reactions reported earlier by Landis and Dailey (Landis, M. E., et al., J. Am. Chem. Soc. 113:3189–3190 (1991)) for magadiite and other layered oxides afford pillared products, not gallery-templated derivatives.

OBJECTS OF THE INVENTION

It is therefore an object of the present invention to provide a novel method for the formation of a porous clay heterostructure, wherein the properties of both the layered component and the bulk mesostructure are combined together resulting in a novel material with improved material properties such as the following:

(a) well defined mesopores in an important size range i.e. between 1.2 and 4.0 nm, for shape-selective processing and/or catalysis; (b) improved thermal and hydrothermal stabilities over ultra large pore crystalline molecular sieves; (c) usefulness as a solid acid catalyst for the cracking of hydrocarbon feed stocks which include large hydrocarbon molecules; and (d) layered and mesostructured gallery components, with broad applications.

Further, it is an object of the present invention to provide a method for preparing the clay heterostructures which is economical.

These and other objects will become increasingly apparent by reference to the following description.

DESCRIPTION OF THE PREFERRED EMBODIMENTS

The present invention relates to a calcined, porous 2:1 layered silicate clay heterostructure with galleries between layers of the clay intercalated with a porous inorganic metal oxide having a spacing between the layers of about 2.5 to 7.5 nm, gallery framework confined pores of between about 1.2 and 4.0 nm as determined by the Horvath-Kawazoe $N_2$ adsorption model.

The present invention also relates to a calcinable intermediate to a heterogeneous calcined clay heterostructure which comprises: a clay with galleries between layers of the clay containing a porous polymeric inorganic metal oxide which is filled with a neutral amine surfactant and quaternary onium ions. The neutral amine can be a primary, secondary or tertiary amine.

The present invention also relates to a method for the formation of a calcined, porous 2:1 layered silicate clay heterostructure with galleries between layers of the clay intercalated with a porous inorganic metal oxide having a spacing between the layers of about 2.5 to 7.5 nm, gallery framework confined pores of between about 1.2 and 4.0 nm as determined by the Horvath-Kawazoe $N_2$ adsorption model which comprises: providing a neutral amine surfactant and a quaternary onium ion in a gallery of a 2:1 layered silicate clay in admixture with a polymeric inorganic metal oxide; and calcining the composition to form the porous clay heterostructure.

The present invention also relates to a method for the formation of an intermediate to a calcined porous clay heterostructure with galleries between layers of the clay containing a polymeric inorganic metal oxide as a porous structure which comprises: introducing a neutral amine template and with a polymerized inorganic metal oxide precursor into a gallery of a 2:1 layered silicate clay containing a quaternary onium ion.

The amines can be primary, secondary or tertiary preferably with one of the alkyl groups containing 6 to 22 carbon atoms. Primary amines ($RNH_2$) are preferred. Aromatic amines, such as phenyl, benzyl, naphthyl and the like can be used. The amines can also contain O, S, N and P. Mixtures of the amines can be used.

The quaternary onium ions (cation) are preferably of the formula:

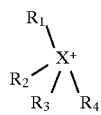

wherein X is P or N and wherein R to $R_4$ is an organic group. Preferably $R_1$ to $R_4$ is an alkyl group containing, at least one of which should have a chain length of at least 6 carbon atoms. Mixtures of the onium ions can be used. Also, secondary and tertiary onium ions can be used but primary onium ions are not effective in forming a porous clay heterostructure by gallery templated synthesis.

The inorganic metal oxide is preferably a silicon oxide. Other metal oxides are alumina, zirconia and titanium, etc. They are prepared from metal hydroxide precursors. Mixtures of the precursors can be used.

The molar ratios of the onium ion:amine:precursor ingredients for PCH synthesis are between about 1:5:37.5 to 1:30:250, preferably 1:20:150. The onium ion clay is impregnated with at least about 10:1 and 5:1 mole ratio of the onium to metal oxide precursor.

The 2:1 layered silicate clays is selected from the group consisting of a smectite clay, including montmorillonite, beidellite, hectorite, fluorohectorite, saponite and nontronite, a vermiculite, a rectorite, a illite and a mica including biotite, muscovite, paragonite, tetrasilica mica and taneolite. Preferred is high charge density smectites with one or more charge units per $O_{20}$ unit cell.

The synthetic, crystalline inorganic-organic layered oxide intermediate has at least two resolved x-ray reflection corresponding to a lattice spacing of 2.5 to 7.5 nm, and gallery confined pores between 1.2 to 4.0 nm and a specific surface area of 400 to 900 square meters per gram. The synthetic, crystalline inorganic-organic layered oxide intermediate is prepared by reacting in a reaction mixture the ionic quaternary onium ion surfactant (such as the ammonium or phosphonium surfactant) as a template along with the neutral primary amine surfactant as a co-template and with the neutral inorganic metal oxide precursor, all within the galleries of the layered silicate with the (2:1) mica type lattice structure, followed by hydrolysis and crosslinking of the inorganic oxide precursor to provide the composition.

The preferred method for the preparation of the synthetic crystalline inorganic-organic layered oxide intermediate comprises providing a mixture of (i) a layered silicate clays with 2:1 mica type lattice structures which provide nanoporous structures. (ii) a neutral inorganic metal oxide precursor containing at least one element selected from the group consisting of di-, tri-, tetra-, penta- and hexavalent elements and mixtures thereof; (iii) a ionic quaternary onium based surfactant as a template and a neutral amine based surfactant as a co-template; mixing of all components to give a homogeneous mixture and separating at least some of the inorganic precursor and surfactant to form the intermediate; and calcining the intermediate to form the clay heterostructure or solvent extracting the intermediate with ethanolic HCl or like solution to form the heterostructure.

The present invention provides a new route to the synthesis of crystalline materials with well defined framework-confined ultramicropore to mesopores and large elementary particle size. The compositions produced in the current invention are distinguished from those of the prior art by the virtue of the method of preparation of the present invention, the subsequent architecture of the pore structure and the range and combination of various layered host and template metal oxides afforded by this route. Formation of the mesoporous network is accomplished by the interaction (electrostatic and hydrogen bonding) between the ionic and neutral surfactants templates and the neutral inorganic precursor, followed by hydrolysis and subsequent condensation of the inorganic reaction product and the subsequent removal of the template.

In the present invention, mesoporous materials are prepared by transforming ionic lamellar solids (clays) into porous derivatives with a well defined pore size in the range 1.2–4.0 nm designated as PCHs. The synthesis is based on the formation of rod micelles-like surfactants and inorganic precursor (similar as the one described in MCM-41 and HMS synthesis) inside the gallery of a previously quaternary-ammonium exchanged-clay. The surfactants used in this synthesis are quaternary ammonium cations and the neutral amines as for MCM-41 and HMS synthesis, respectively. The assembly of this mixed ionic and non-ionic surfactants system with the inorganic precursor (TEOS) gives rise to a well defined silica mesostructure in sandwich between the clay layers.

EXAMPLES 1–8

Synthesis of organo-clay derivatives.

Several organo-clay derivatives, (abbreviated as $Q^+$-Clay) of, fluorohectorite, rectorite and vermiculite were synthesized using quaternary ammonium surfactant compounds of $C_{16}H_{33}N^+(CH_3)_3$, $C_{10}H_{21}N^+(CH_3)_3$ and $C_{12}H_{25}N^+(CH_3)_3$ cations abbreviated as HDTMA$^+$, DTMA$^+$ and DDTMA$^+$, respectively.

together with the corresponding physico-chemical parameters are summarized in Table 1.

| Examples | Quaternary ammonium exchange cation | Amine Co-template | Gallery height of air-dried products (nm) | Gallery height of calcined products (600° C.) (nm) | Specific Surface Areas of Calcined Samples $S_{BET}$ m$^2$g$^{-1}$ | Calcined Pore size (nm) H&K |
|---|---|---|---|---|---|---|
| 1 | HDTMA$^+$ | $C_6H_{13}NH_2$ | 2.22 | 1.49 | 550 | 1.5 |
| 2 | | $C_8H_{17}NH_2$ | 2.24 | 1.84 | 680 | 1.8 |
| 3 | | $C_{10}H_{21}NH_2$ | 2.84 | 2.24 | 800 | 2.1 |
| 4 | | $C_{12}H_{25}NH_2$ | 3.44 | 2.34 | 750 | 2.2 |
| 5 | DDTMA+ | $C_8H_{17}NH_2$ | 2.9 | 1.7 | 600 | 1.6 |
| 6 | | $C_{10}H_{21}NH_2$ | 3.1 | 2.0 | 660 | 1.8 |
| 7 | DTMA+ | $C_8H_{17}NH_2$ | 1.76 | 1.40 | 560 | 1.4 |
| 8 | | $C_{10}H_{21}NH_2$ | 2.39 | 1.43 | 600 | 1.4 |

To a 1 wt % suspension of clay was added a 0.3M aqueous solution of the ammonium salt. The amount of salt was twice the cation exchange capacity of the clay. The suspension was stirred for 24 hours at 50° C. to obtain a complete ion exchange between sodium ions in the clay and the quaternary ammonium ion (Q$^+$). The resulting organo-clay (Q$^+$-Clay) was centrifuged, washed repeatedly with ethanol to remove all the excess ions, and then re-suspended in water. The product was collected by centrifugation and air dried at room temperature.

Synthesis of amine-solvated organo-clay dterivative.

The amine-solvated Q$^+$-Clay was prepared by adding the desired neat alkylamine ($C_nH_{2n+1}NH_2$, n=6, 8, 10, 12) to Q$^+$-Clay at a mole ratio of Amine: Q$^+$-Clay of 20:1. The entire reaction mixture was stirred for 30 minutes and the mixtures were used for the final PCH synthesis.

Synthesis of the Porous Clay Heterostuctures (PCHs).

Mixtures of Q$^+$-Clay: Amine:TEOS at molar ratio 1:20:150 were vigorously stirred for 4 hours at room temperature in a closed container (extended periods of stirring gave similar results). The resulting intercalates were centrifuged and dried (without washing) in open atmosphere to further promote intragallery TEOS hydrolysis. The air-dried products were then calcined at 650° C. for 4 hours to remove the templating surfactants and afford a crystalline porous clay heterostructure.

The X-ray powder diffraction (XRD) patterns of all the samples were obtained with a RIGAKU ROTAFLEX (Japan) diffractometer equipped with a rotating anode and Cu$_{K\alpha}$ radiation ($\lambda$=0.15148 nm). The diffraction data were recorded by step scanning at 0.02 degrees of 2 theta, where theta is the Bragg angle and photon counting time of 1 sec step-1. The d-spacing of the X-ray reflections of the samples were calculated in nm. The pore structures of said composition were characterized by measuring $N_2$ adsorption-desorption isotherms using a Coulter 360 CX sorptometer. Isotherms were recorded at 70° K. using a standard continuous sorption procedure. Before measurement, each sample was outgassed overnight at 323° K. and 10$^{-6}$ torr. The specific surface areas ($S_{BET}$, m$^2$ g$^{-1}$) and the total pore volumes ($V_p$, mL g$^{-1}$), which were calculated from the adsorption isotherms following IUPAC recommendations (Sing et al., Pure Appl. Chem., 57:603–619 (1985)). The pore size distributions of the compositions were calculated following the method of Horvath and Kawazoe (G. Horvath and K. J. Kawazoe, J. Chem. Eng. Jpn. 16:470–475 (1983)). Thermogravimetric analyses of the samples were performed under a flow of dry $N_2$gas on a CAHN system thermogravimetric gas (TG) analyzer using a heating rate of 5° K. min-1. The results from each surfactants used in the Examples 1–8,

EXAMPLES 9–20

The following examples were prepared to determine the preferred mole ratio of Amine:TEOS needed for porous clay heterostructure formation. The Q$^+$-Clay were prepared analogous to Examples 1–8.

Mixtures of Q$^+$-Clay:Amine:TEOS at molar ratio in the range 1:2:15 to 1:20:200 were vigorously stirred for 4 hours at room temperature in a closed container (extended periods of stirring gave similar results). The resulting intercalates were centrifuged and dried (without washing) in open atmosphere to further promote intragallery TEOS hydrolysis. The air-dried products were then calcined at 650° C. for 4 hours to remove the templating surfactants and afford a crystalline porous clay heterostructure. The results from each surfactants used in the examples, together with the corresponding physico-chemical parameters are summarized in Table 2.

TABLE 2

| Ex. | Exchange cation | Gallery height of air dried sample (nm) | Gallery height of calcined sample (nm) | TEOS: neutral amine molar ratio | $S_{BET}$ $_{m2}g$-1 | H&K (nm) |
|---|---|---|---|---|---|---|
| 9 | DTMA$^+$ | 2.74 | 0.27 | 0.5 | 200 | 0 |
| 10 | | 2.44 | 0.27 | 5.0 | 260 | 0 |
| 11 | | 2.44 | 1.39 | 7.5 | 560 | 1.4 |
| 12 | | 2.34 | 1.44 | 10 | 650 | 1.4 |
| 13 | DDTMA$^+$ | 2.94 | 0.27 | 0.5 | 170 | 0 |
| 14 | | 2.64 | 1.64 | 5.0 | 350 | 0 |
| 15 | | 2.64 | 1.8 | 7.5 | 660 | 1.7 |
| 16 | | 2.64 | 1.8 | 10 | 750 | 1.7 |
| 17 | HDTMA$^+$ | 2.84 | 0.25 | 0.5 | 300 | 0 |
| 18 | | 2.84 | 20.0 | 5.0 | 350 | 0 |
| 19 | | 2.84 | 2.10 | 7.5 | 800 | 2.1 |
| 20 | | 2.84 | 2.14 | 1.0 | 850 | 2.1 |

*Gallery height = basal spacing − layer thickness of clay (9.6 nm)
DTMA$^+$ = $C_{10}H_{21}N^+(CH_3)_3$, DDTMA$^+$ = $C_{12}H_{25}N^+(CH_3)_3$, HDTMA$^+$ = $C_{16}H_{33}N^+(CH_3)_3$.

Preferably the ratio of amine to TEOS is at least about 7.5 to 1.

COMPARATIVE EXAMPLES 21–32

The above reaction of Examples 1 to 20 was performed in order to determine porous clay heterostructure formation using a different ionic surfactant with a smaller head group size. The results from these experiments further support the gallery templation concept as opposed to the prior art of pillaring of layered materials. The results for the above, together with the corresponding physico-chemical parameters are summarized in Table 3.

TABLE 3

Fluorohectorite is the layered silicate and decylamine as a co-template.

| Ex. | Exchange cation | Gallery height of air dried sample (nm) | Gallery height of calcined sample (nm) | TEOS: neutral amine molar ratio | $S_{BET}$ $m^2g$-1 |
|---|---|---|---|---|---|
| 21 | $DA^+$ | 2.74 | 0.3 | 0.5 | 175 |
| 22 | | 2.44 | 0.3 | 5.0 | 200 |
| 23 | | 2.44 | 0.3 | 7.5 | 200 |
| 24 | | 2.34 | 0.34 | 10 | 210 |
| 25 | $DDA^+$ | 2.94 | 0.28 | 0.5 | 250 |
| 26 | | 2.64 | 0.28 | 5.0 | 210 |
| 27 | | 2.64 | 0.29 | 10 | 230 |
| 28 | | 2.60 | 0.29 | 10 | 230 |
| 29 | $HDA^+$ | 3.04 | 0.25 | 0.5 | 250 |
| 30 | | 2.74 | 0.25 | 5.0 | 300 |

TABLE 3-continued

Fluorohectorite is the layered silicate and decylamine as a co-template.

| Ex. | Exchange cation | Gallery height of air dried sample (nm) | Gallery height of calcined sample (nm) | TEOS: neutral amine molar ratio | $S_{BET}$ $m^2g$-1 |
|---|---|---|---|---|---|
| 31 | | 2.64 | 0.25 | 7.5 | 300 |
| 32 | | 2.64 | 0.25 | 10 | 300 |

*Gallery height = basal spacing − layer thickness of clay (9.6 nm)
$DA^+ = C_{10}H_{21}NH_3^+$, $DTMA^+ = C_{12}H_{25}NH_3^+$, $HDA^+ = C_{16}H_{33}NH_3^+$.

There was no PCH formation. All products are silica plus carbon intercalates with small gallery heights (less than 1.0 nm) and little or no gallery porosity.

EXAMPLE 33

PCHs prepared from $T^+$-clays, Tertiary Amines and TEOS.
Synthesis of organo-clay derivatives interlayered by tertiary onium ions ($T^+$)

Several organo-clay derivative (abbreviated as $T^+$-Clay) of fluorohectorite, rectorite and vermiculite were synthesized using tertiary ammonium surfactant compounds of $C_{18}H_{37}N^+H(CH_3)_2$, $C_{16}H_{33}N^+H(CH_3)_2$, $C_{14}H_{29}N^+H(CH_3)_2$, $C_{12}H_{25}N^+H(CH_3)_2$, $C_{10}H_{21}N^+H(CH_3)_2$, $C_8H_{16}N^+H(CH_3)_2$ cations abbreviated as $ODDMA^+$, $HDDMA^+$, $TDDMA^+$ $DDDMA^+$ and $DDMA^+$, and $ODMA^+$, respectively.

To a 1 wt % suspension of clay was added a 0.3M aqueous solution of the onium salt. The amount of salt was twice the cation exchange capacity of the clay. The suspension was stirred for 24 hours at 50° C. to facilitate complete ion exchange. The resulting organo-clay ($T^+$-Clay) was centrifuged, washed repeatedly with ethanol to remove all the excess ions, and then re-suspended in water. The product was collected by centrifugation and air dried at room temperature.

Synthesis of amine-solvated organo-clay derivative.

The amine solvated $T^+$-Clay was prepared by adding the desired neat tertiary alkylamine ($C_nH_{2n+1}N(CH_3)_2$, n=6, 8, 10, 12, 14, 16, 18) to $T^+$-Clay at a mole ratio of Amine:$T^+$-Clay of 20:1. The entire reaction mixture was stirred for 30 minutes and the mixture used for the final PCH synthesis.

Synthesis of the Porous Clay Heterostructures (PCHs).

Mixtures of $T^+$-Clay:Amine:TEOS at molar ratio 1:20:150 were vigorously stirred for 4 hours at room temperature in a closed container. The resulting intercalates were centrifuged and dried (without washing) in open atmosphere to further promote intragallery TEOS hydrolysis. The air-dried products were then calcined at 650° C. for 4 hours to remove the templating surfactants and afford a crystalline porous clay heterostructure. The results are shown in Table 4.

TABLE 4

| Ex. | Quaternary ammonium exchange cation | Amine Co-template | Gallery height of air-dried products (nm) | Gallery height of calcined products (600° C.) (nm) | Specific Surface Areas of Calcined Samples $S_{BET}$ $m^2g^{-1}$ | Pore Size (nm) H&K |
|---|---|---|---|---|---|---|
| 1 | DDMA | $C_{12}$NMe | 2.8 | 2.1 | 750 | 2.0 |

EXAMPLE 34

PCHs Prepared From $Q^+$-Clay, Tertiary Amine Co-surfactant and TEOS.
Synthesis of organo-clay derivatives.

Several quaternary onium ion clay derivatives (abbreviated as $Q^+$-Clay) of fluorohectorite, rectorite and vermiculite were synthesized using quaternary ammonium surface salts of $C_{16}H_{33}N^+(CH_3)_3$, $C_{10}H_{21}N^+(CH_3)_3$ and $C_{12}H_{25}N^+(CH_3)_3$ cations abbreviated as $HDTMA^+$, $DTMA^+$ and $DDTMA^+$, respectively.

To a 1 wt % suspension of clay was added a 0.3M aqueous solution of the ammonium salt. The amount of salt was twice the cation exchange capacity of the clay. The suspension was stirred for 24 hours at 50° C. to obtain complete ion exchange. The resulting organo-clay ($Q^+$-Clay) was centrifuged, washed repeatedly with ethanol to remove all the excess ions, and then re-suspended in water. The product was collected by centrifugation and air dried at room temperature.

Synthesis of T amine-solvated organo-clay derivative.

The amine-solvated $Q^+$-Clay was prepared by adding the desired neat tertiary alkylamine ($C_nH_{2n+1}N(CH_3)_2$ n=6, 8, 10, 12, 14, 16, 18) to $Q^+$-Clay at a mole ratio of Amine:$Q^+$-Clay of 20:1. The entire reaction mixture was stirred for 30 minutes and the mixture used for the final PCH synthesis.

Synthesis of the Porous Clay Heterostructures (PCHs).

Mixtures of $Q^+$-Clay:T Amine:TEOS at molar ratio 1:20:150 were vigorously stirred for 4 hours at room temperature in a closed container (extended periods of stirring gave similar results). The resulting intercalates were centrifuged and dried (without washing) in open atmosphere to further promote intragallery TEOS hydrolysis. The air-dried products were then calcined at 650° C. for 4 hours to remove the templating surfactants and afford a crystalline porous clay heterostructure.

The derivative formed from HDTMA$^+$-fluorohectorite, $C_{12}H_{25}N(CH_3)_2$ as a co-surfactant and TEOS gave a XRD basal spacing of 5.25 nm (air dried), 4.5 nm (calcined), a surface area 900 m$^2$/g and a Horvath-Kawazoe pore size of 3.5 nm.

The improvements of the present invention are particularly:

1. A crystalline layered silicate clay intermediate with (2:1) mica type lattice structure and with a gallery composition comprising the mesostructured organic surfactants as a template and inorganic metal oxides, particularly a synthetic, crystalline inorganic-organic layered metal oxide composition having one or more resolved X-ray reflections corresponding to a lattice spacing of 2.5 to 7.5 nm, and gallery confined pores between 1.2 to 4.0 nm and a specific surface area of 400 to 900 square meters per gram.

2. A synthetic, crystalline inorganic-organic layered oxide intermediate prepared by reacting in a reaction mixture a ionic quaternary ammonium surfactant as a template along with a neutral primary amine surfactant as a co-template and a neutral inorganic oxide precursor, within the galleries of a layered silicate with (2:1) mica type lattice structure, followed by hydrolysis and cross-linking of the inorganic oxide precursor to provide the intermediate. These can be removed by calcining or by solvent extraction with an ethanolic HCl solution.

3. A method for the preparation of a synthetic crystalline inorganic-organic layered oxide clay heterostructure which comprises: providing a mixture of (i) a layered silicate clays with 2:1 mica type lattice structures for the design of nanoporous structures. (ii) a neutral inorganic oxide precursor containing at least one element selected from a group consisting of di-, tri-, tetra-, penta- and hexavalent elements and mixtures thereof; (iii) a ionic onium ion based surfactant as a template and a neutral primary amine based surfactant as a co-template; mixing of all components to give a homogeneous mixture and separating at least some of the inorganic precursor and surfactant to form the composition and then calcining the composition. The result is a new route to the synthesis of crystalline materials with well defined gallery framework large micropores to small mesopores and large elementary particle size.

Preferably the composition has X-ray diffraction patterns with at least two reflection corresponding to a lattice of between about 2.5 to 7.5 nm; the clay heterostructure after calcination has an $N_2$, $O_2$ or Ar adsorption-desorption isotherm with a step at $P/P_O$ between 0.1 to 0.4 and at least one hysteresis loop. The clay heterostructure has a specific surface area between 400 to 900 square meters per gram.

It is intended that the foregoing description be only illustrative of the present invention and that the present invention be limited only by the hereinafter appended claims.

We claim:

1. A calcined, porous 2:1 layered silicate clay heterostructure with galleries between layers of the clay intercalated with a porous inorganic metal oxide having a spacing between the layers of about 3 to 5 nm, and gallery framework confined pores of between about 1.4 and 2.5 nm as determined by the Horvath-Kawazoe $N_2$ adsorption model derived from a calcinable intermediate which comprises the porous 2:1 layered silicate clay with the galleries between layers of the clay containing a porous polymeric inorganic metal oxide and which is filled with a neutral amine surfactant and quaternary onium ions.

2. The clay heterostructure of claim 1 wherein the inorganic metal oxide is at least in part a silicon oxide.

3. The clay heterostructure of any one of claims 1 or 2 wherein the calcinable intermediate is produced by introducing the polymeric metal oxide into the quaternary onium ion exchanged form of the clay to provide the calcinable intermediate which is then calcined.

4. The clay heterostructure of claim 3 wherein the onium ion is selected from the group consisting of a quaternary ammonium, a tertiary ammonium and a secondary ammonium ion.

5. The clay heterostructure of any one of claims 1 or 2 wherein the 2:1 layered silicate is selected from the group consisting of a smectite clay, a vermiculite, a rectorite, an illite and a mica.

6. The clay heterostructure of any one of claims 1 or 2 wherein the neutral amine surfactant has the structural formula:

R—NH$_2$, R$_2$NH, or R$_3$N wherein at least one R group is an organic group with a chain length of 6 to 22 carbon atoms.

7. The clay heterostructure of any one of claims 1 or 2 wherein the neutral amine surfactant has the formula:

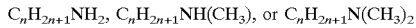

$C_nH_{2n+1}NH_2$, $C_nH_{2n+1}NH(CH_3)$, or $C_nH_{2n+1}N(CH_3)_2$ wherein n is an integer between about 6 and 22.

8. The clay heterostructure of claim 1 wherein the onium ion is selected from the group consisting of a quaternary ammonium, a tertiary and secondary quaternary ammonium ion.

* * * * *